Aug. 15, 1950     E. C. PETERS ET AL     2,519,322
MOLASSES DISPENSER FOR CATTLE
Filed March 6, 1947     2 Sheets-Sheet 1
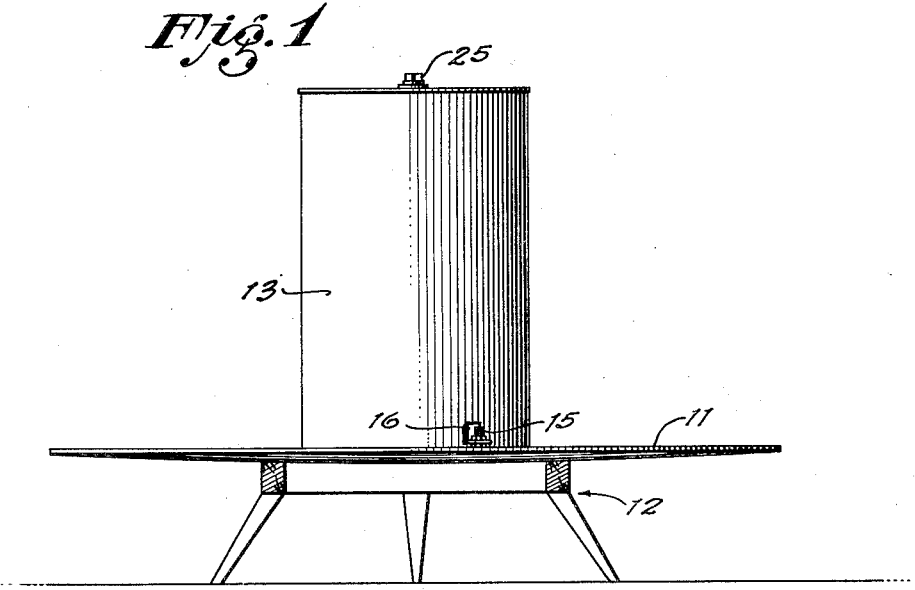
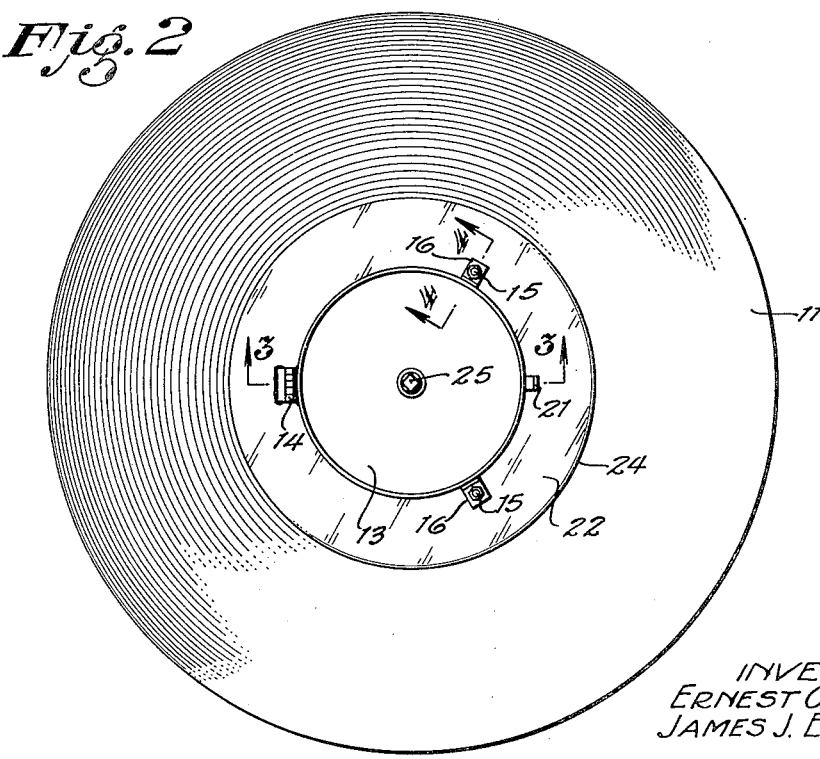
INVENTORS,
ERNEST C. PETERS
JAMES J. ENGLISH
John H. Rouse,
ATTORNEY.

Aug. 15, 1950 E. C. PETERS ET AL 2,519,322
MOLASSES DISPENSER FOR CATTLE
Filed March 6, 1947 2 Sheets-Sheet 2
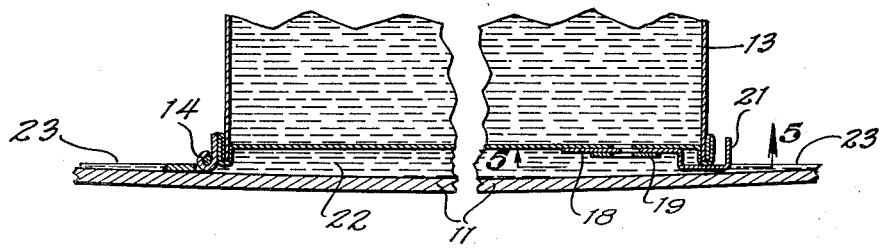
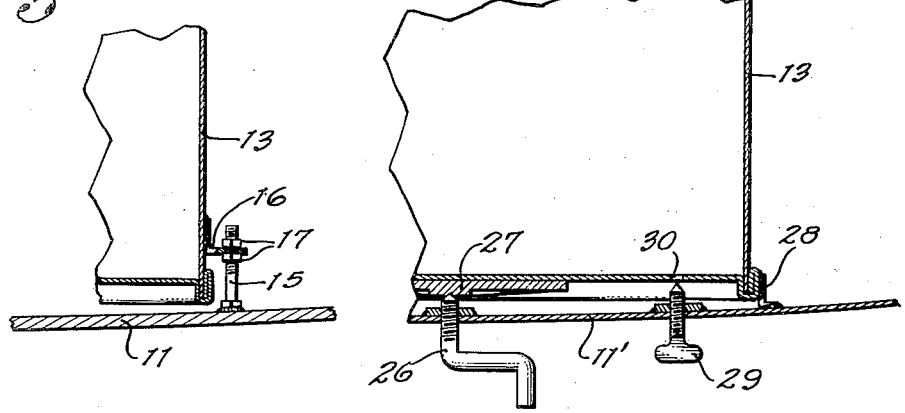
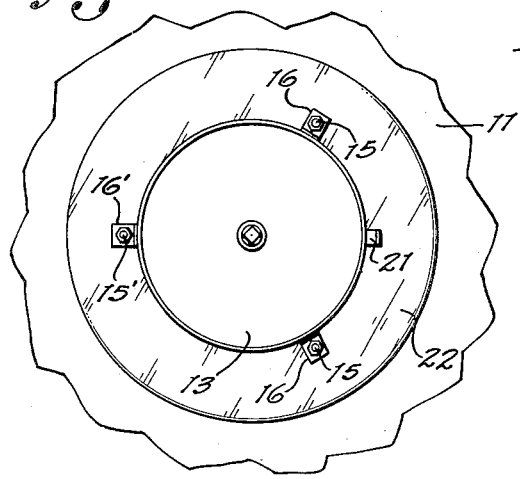
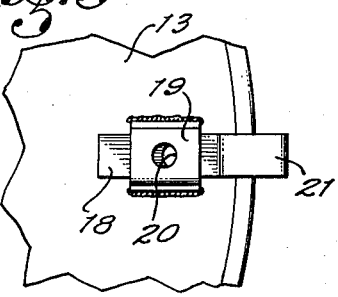
INVENTORS,
ERNEST C. PETERS
JAMES J. ENGLISH
ATTORNEY.

Patented Aug. 15, 1950

2,519,322

UNITED STATES PATENT OFFICE 2,519,322

MOLASSES DISPENSER FOR CATTLE

Ernest C. Peters, Norwalk, and James J. English, Whittier, Calif., assignors to Stewart A. Downs and Louise S. Downs, as joint tenants, Whittier, Calif.

Application March 6, 1947, Serial No. 732,693

3 Claims. (Cl. 119—77)

This invention relates to means for dispensing molasses to cattle.

The beneficial effect of molasses in the diet of cattle has been recognized for some time, and it is now customary in some districts to mix a certain proportional amount of molasses with the prepared cattle-feed. However, apart from the expense involved in preparing the mixture, this manner of supplying the molasses appears to be unsatisfactory for the reason that it has been observed that when molasses is made available to cattle separate from their regular feed the amount of molasses (in proportion to other feed) consumed by individual ones varies considerably, and it is therefore a logical conclusion that if the molasses is mixed with the feed some of the cattle obtain too much of it and others too little to meet their individual requirements. It has therefore been proposed to provide a separate source of molasses as in a trough or spread on the ground, but such methods are wasteful and unsanitary because of flies and other insects which accumulate in the molasses, and also because of souring and dehydration of the molasses which occur when it is exposed to the air for some length of time. It is therefore an object of our invention to provide a dispenser whereby only the minimum necessary amount of molasses is constantly exposed, so that the possibility of spoilage and contamination by insects is reduced, and in such a way that the molasses is most conveniently available for consumption by the cattle.

For full understanding of the invention, and further appreciation of its objects and advantages, reference is to be had to the following detailed description and accompanying drawing, and to the appended claims.

In the drawing:

Figures 1 and 2 are views in elevation and in plan, respectively, of a molasses dispenser embodying features of our invention;

Figures 3 and 4 are fragmentary sections, in enlarged scale, taken along the lines 3—3 and 4—4, respectively, of Fig. 2;

Figure 5 is a detail view taken in the plane of line 5—5 of Fig. 3;

Figure 6 is a plan showing a modified form of the invention; and

Figure 7 is a sectional view showing modified structural details.

Referring first more particularly to Figs. 1–5 of the drawing, the numeral 11 indicates a circular plate, of material such as boiler-plate, which is supported at a convenient height above the level of the ground by a wooden frame 12. On top of the plate 11 and at the middle thereof is a cylindrical container 13 which conveniently may be a metal drum of the type commonly employed for storing and marketing molasses. As is seen in Figs. 2 and 3, the drum is connected at one point adjacent its bottom to the plate by a hinge 14 welded to the parts, and at other similar points, spaced angularly 120° from the hinge, by bolts 15 welded at their heads to the plate and cooperating with angle-brackets 16 welded to the side wall of the drum. By manipulation of the bolt-nuts 17 the drum can be tilted adjustably about the hinge for a purpose to be described hereinafter. Cooperating with an opening through the bottom wall of the drum, and shown in detail in Figs. 3 and 5, is a slide valve consisting of an apertured slider 18 the inner portion of which is guided by a channeled member 19 welded to the drum and having an opening 20 in register with the drum-opening; the slider having a handle portion 21, extending beyond the drum, whereby the valve can be opened or closed, or partially-opened as shown in the drawing.

The plate 11 is formed or dished to provide a shallow concave top surface which serves as a receptacle for the molasses 22. For the sake of clarity, the concavity of the plate is shown in the drawing in a somewhat exaggerated degree; it being in a practical embodiment such that the center of the plate is about five-eighths of an inch below the rim when the diameter of the plate is five feet. A plate of that size is suitable when the drum is about two feet in diameter; the distance between the side wall of the drum and the rim of the plate then being eighteen inches.

Since the drum 13 is tightly closed except for the opening through its bottom wall, atmospheric pressure acts to prevent further discharge of molasses from the drum when the level of the molasses in the plate or receptacle reaches the top of the effective discharge-opening, which in the drum illustrated is defined by the highest portion (normally, that opposite the hinge) of the bottom rim of the drum due to the fact that the side wall of the drum extends below the apertured bottom wall of the same. Thus, as the molasses is consumed by the cattle it is kept constantly at the level indicated by the numeral 23 in Fig. 3, which level corresponds to a radial spread of about six inches from the drum, as shown in Fig. 2. Obviously, the drum could be at a greater height above the plate and have a discharge-pipe depending to the proper level, but the arrangement illustrated is preferred since by positioning the drum so that the rim of the same defines the discharge-opening, only that area of the molasses which is available to the cattle is exposed to the atmosphere and to insects.

By adjustably tilting the drum, as described above, the level of the molasses in the plate can be raised or lowered so that the area of the molasses exposed beyond the drum is correspondingly increased or decreased to meet the requirements of herds of cattle of different size, but it is essential to preserve at all times a relatively large "licking-space" between the outer edge of the molasses (indicated at 24 in Fig. 2) and the rim of the plate. As shown in Fig. 2, the radial width of the licking-space is one foot and, as previously mentioned, that of the exposed molasses six inches, so that, when feeding, the heads of the cattle are close to the drum and the licking-space catches any drippings from their mouths or chins, which drippings are promptly licked-up so that the space is normally free from molasses.

It is thus apparent that since only the minimum necessary amount of molasses is exposed, and drippings or spillage away from the dispenser are prevented, the molasses is dispensed in a most sanitary and economical manner.

The main purpose of the slide valve 18—19 is to prevent escape of molasses when the plug 25 in the top wall of the drum is removed while replenishing the supply of molasses; however, the valve may also be employed to vary the rate of discharge of molasses when, for example, the viscosity of the molasses or the size of the cattle-herd changes considerably.

The modified form of dispenser shown in Fig. 6 is the same as that shown in Figs. 1–5 except that in place of the hinge the drum is provided with a third bracket-and-bolt support of the type indicated at 15—16—17 in Fig. 4; the corresponding parts of the third support having been assigned primed numerals in Fig. 6. To adjust the level or extent of spread of the molasses in the receptacle, the drum is raised or lowered vertically by manipulation of the three pairs of nuts.

In Fig. 7, the circular plate, there indicated by the numeral 11', has the same area as the plate in the other figures and is arranged in generally the same manner in relation to the drum 13. However, this plate 11' is relatively thin so that it can be flexed by manipulation of a crank-handled screw 26 threaded in a central reinforced portion of the plate and bearing against the bottom wall of the drum through the medium of a pressure-distributing disk 27; the drum in this instance preferably being connected to the plate by a plurality of angle-brackets 28 welded directly to the parts and so arranged that the bottom rim of the drum is spaced a short distance above the plate. Thus, when force is applied to the center of the plate, the brackets 28 serve as pivots or fulcrums about which the plate flexes or buckles to produce a concavity similar to that of the preformed plate shown in the other figures. To adjust the extent of spread of the molasses beyond the drum, the screw 26 is manipulated to vary the degree of concavity of the plate.

There is also disclosed in Fig. 7 a simplified form of valve which consists of a thumb screw 29 threaded in an opening through a reinforced portion of the plate 11' and having a conical tip cooperable with an opening 30 in the bottom wall of the drum.

The specific embodiments of our invention herein shown and described are obviously susceptible of modification without departing from the spirit of the invention, and we intend therefore to be limited only by the scope of the appended claims.

We claim as our invention:

1. In a device for dispensing molasses to cattle: the combination of a shallow dished receptacle having an outer rim and a molasses-receiving surface sloping downwardly from the rim, the slope of said surface corresponding effectively to an angle of the order of 2° with reference to the horizontal plane of the rim, a storage container for the molasses mounted at a height such that the plane of its bottom is above said surface, and conduit means leading from the container to said receiving surface, said conduit means being so constructed and arranged as to permit accumulation of molasses at the lower part of the receiving surface while leaving a licking-space adjacent said rim of substantial size and normally free from molasses.

2. The combination defined in claim 1, and wherein the area of said licking-space is at least as great as the area of the surface of the molasses accessible to the cattle.

3. The combination defined in claim 1, and wherein said molasses container is mounted above and adjacent said receptacle, the size of said container being such that only part of the receptacle is covered thereby.

ERNEST C. PETERS.
JAMES J. ENGLISH.

REFERENCES CITED

The following references are of record in the file of this patent:

UNITED STATES PATENTS

| Number | Name | Date |
| --- | --- | --- |
| 137,390 | Stamberger | Apr. 1, 1873 |
| 143,499 | Chatillon | Oct. 7, 1873 |
| 232,847 | Ratcliff | Oct. 5, 1880 |
| 821,493 | House | May 22, 1906 |
| 832,700 | Rockwell | Oct. 9, 1906 |
| 903,041 | Yerian | Nov. 3, 1908 |
| 980,496 | Crockford | Jan. 31, 1911 |
| 1,052,631 | Waters | Feb. 11, 1913 |
| 1,672,796 | Whitmore | June 5, 1928 |
| 2,365,862 | Bufton | Dec. 26, 1944 |

OTHER REFERENCES

Starline Inc., Harvard, Illinois, Cat. 98, item 102, page 13, received in Div. 2, Jan. 21, 1933.